March 4, 1969 C. W. MUSSER 3,431,036
SUBMERGIBLE ANTIFRICTION BEARINGS
Filed June 8, 1967 Sheet 1 of 2
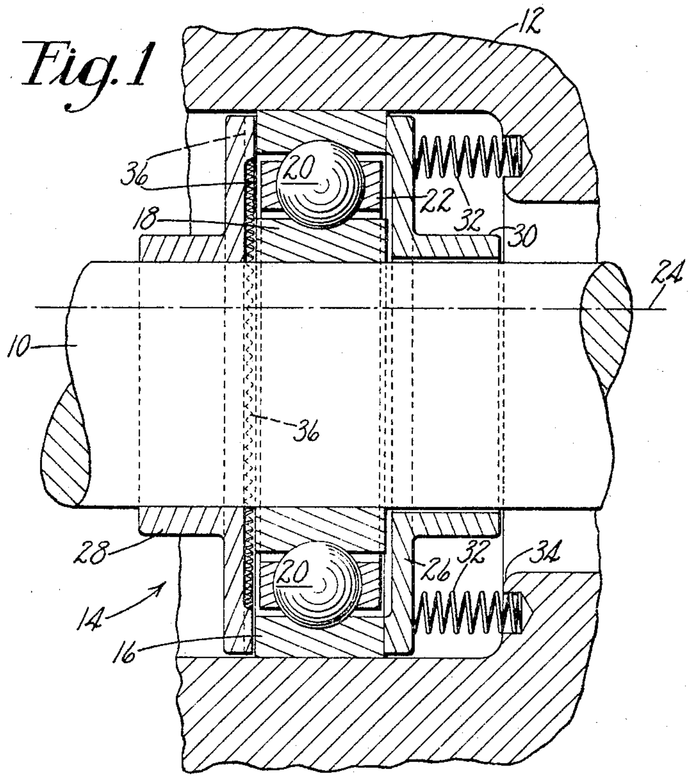
Fig. 1
Fig. 2
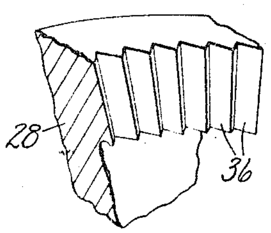
Fig. 3
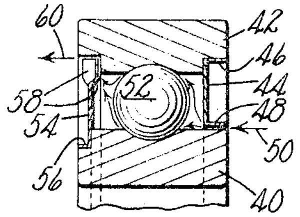
Fig. 4
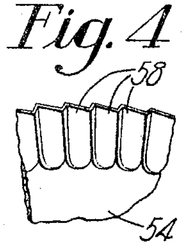
Inventor
C Walton Musser
By his Attorney
Carl E. Johnson

United States Patent Office 3,431,036
Patented Mar. 4, 1969

1

2

3,431,036

SUBMERGIBLE ANTIFRICTION BEARINGS

C Walton Musser, Palos Verdes Estates, Calif., assignor to United Shoe Machinery Corporation, Flemington, N.J., a corporation of New Jersey Filed June 8, 1967, Ser. No. 644,598
U.S. Cl. 308—187 11 Claims
Int. Cl. F16c *1/24, 33/78*

ABSTRACT OF THE DISCLOSURE

An anti-friction bearing having means associated therewith for controlling the flow of lubricant and gas to and from its rolling elements. A substantially stationary shield at one side of the bearing defines a lubricant inlet, and on the opposite side a rotary shield serves as an impeller to eliminate from between the races of the bearing excess fluid whereby the bearing may operate, even when fully submerged, at relatively high speed without undue rise in temperature.

*Background of the invention*

This invention relates to the provisions of antifriction bearings capable of advantageous use even though, and perhaps particularly when, submerged in liquid lubricant. It has hitherto been found that ball or roller bearings submerged in oil, or "over-lubricated," experience a serious temperature rise unless their ball or roller speeds are relatively slow. The bearing rolling elements in known construction trap lubricant between inner and outer race rings that is in their path and may violently dislodge it. If the bearings be submerged, lubricant flows instantly into the void in back of the rolling elements, there being a continual pumping of oil out of the path of each element and into the space it has just occupied. Upon increasing their velocity, unless the lubricant level is reduced below the center of the lowermost rolling element (or becomes a fine mist in the case of very high speeds) the rolling elements produce a fluid friction due to the pumping or churning action which rapidly results in excessive heating and breakdown of the lubricant, and possibly of the mechanism. But requiring maintenance of oil level to the center of the lowermost rolling element or other specified lower level becomes burdensome, an oil sump may be needed, and the machinery in which the bearing is used may have to be restricted to one positional operation only.

*Summary of the invention*

In view of the foregoing it is a primary object of this invention to provide an antifriction bearing having novel means for advantageously controlling the flow of lubricant to its rolling elements whereby they may operate even fully submerged and at relatively high DN values.

Other objects of the invention are to provide an improved bearing assembly relatively insensitive to the amount of lubricant supplied, capable of operation in any position where air or gas is available, having superior heat distribution, allowing the use of higher viscosity oil, and having higher high speed efficiency.

A more specific object is to provide an improved lubrication system for use in an actuator of the harmonic drive type.

To these ends, the invention contemplates, in several alternate arrangements, attaining the desired rate of controlled lubricant flow by using a pair of shields, one of them being substantially stationary and associated with one side of an outer race ring to define a lubricant inlet to the rolling elements, and the other shield being associated with the opposite side of an inner race ring and adapted to serve as a rotary impeller for centrifugally inducing an efflux of lubricant from the rolling elements. In the preferred form for general use, as herein shown, the substantially non-rotating shield has a press-fit with the outer race and may be channel shaped, and the impeller shield may be drivingly connected to the inner race, for instance by a press-fit, and have its inside, outer rim or margin V-crimped to effect or assist centrifugal action.

In the event the bearing is fully submerged in lubricant, and for the purpose of facilitating the circulation of air and lubricant to, around, and from the rolling elements a venting system appropriately complements the novel bearing, the arrangement sometimes being termed an "aero-lube" system. Variance in shield design and mounting, together with usage of air vent plugs and air by-pass plugs to accommodate mechanism operable in different attitudes are other features of the invention as herein illustrated with respect to the several applications.

*Brief description of the drawings*

The foregoing and other features of the invention, together with novel details of construction, will be more particularly described with reference to illustrated embodiments and in connection with the accompanying drawings, in which:

FIG. 1 is an axial section of a shaft mounting bearing assembly according to this invention, one arrangement of opposed lubricating shields being shown;

FIG. 2 is a detail in perspective of impeller teeth formed on a rotary one of the lubricating shields shown in FIG. 1;

FIG. 3 is a sectional view of a portion of an antifriction bearing adapted for submerged operation and wherein opposed side shields are secured to the inner and outer race rings, respectively;

FIG. 4 is a detail in perspective of corrugated impeller teeth formed on the rotary one of the lubricating shields shown in FIG. 3.

*Description of the preferred embodiment*

Figure 5:
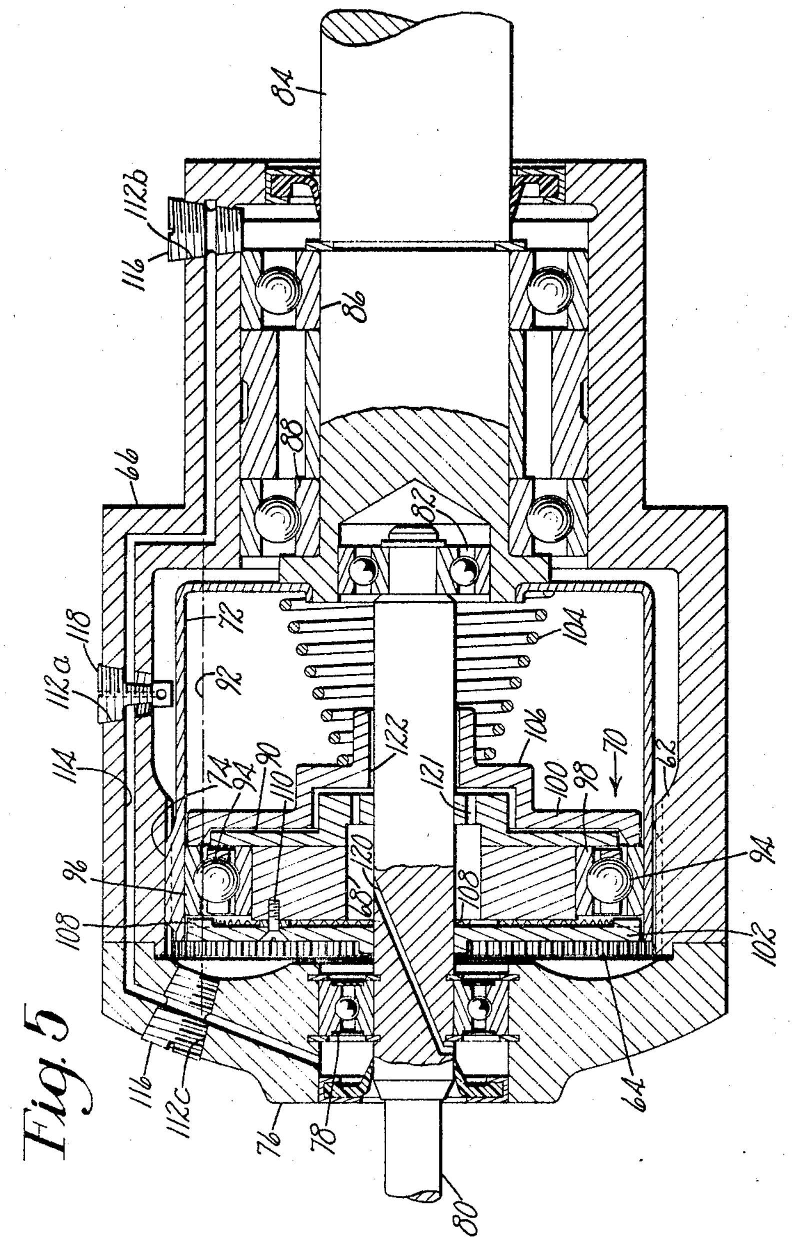
FIG. 5 is an axial section of a harmonic drive type reducer incorporating, in accordance with this invention, an aero-lube system for adapting it to all-attitude operation.

It will be understood that although the illustrative embodiments include balls as rolling elements, the invention is applicable as well to antifriction bearings using cylindrical, hour glass, barrel or other rollers.

Referring to FIG. 1, a shaft 10 is rotatably supported within a bore of a housing 12 by means of a bearing assembly generally designated 14. The bearing comprises an outer race ring 16, an inner coaxial race ring 18, rolling elements in the form of balls 20, and a separator 22. For lubricating the bearing an oil level not higher than the lowermost ball would normally be specified in order to prevent an undue rise in operating temperature. A higher oil level, for instance as at 24, is permitted by the use of this invention as will be explained, thus insuring no undue rise in temperature, increasing the intervals allowable between changing or adding oil, and reducing the attention required for purposes of maintenance. For this purpose the bearing assembly of FIG. 1 includes a pair of shields 26, 28 suitably controlling the flow of lubricant to and from the rolling elements 20.

The shield 26 is substantially stationary, fits closely and seals against the outer race ring 16, and has a hub portion 30 formed with a relatively loose clearance fit with the shaft 10. This clearance provides the inlet for lubricant to be supplied to the rolling elements, the shield 26 being held in place by any convenient means, for instance axial springs 32, respectively seated in a shoulder 34 formed on the housing 12. While requirements will differ with temperature range, loads, viscosity, etc., good test results were attained using a diametral clearance of .005″ on a .625″ diameter shaft, this constituting in effect an annular inlet orifice equal in area to a hole .080″ in diameter.

The shield 28 is rotatably driven to function as an impeller for circulating oil centrifugally on the opposite or outlet side on the bearing assembly 14. To this end the shield 28 is shown as having a press-fit with the shaft 10, but alternatively it may be secured to the inner race 18. In order to serve more effectively as a lubricating pump, the inside face of the shield 28 at its circumferential margin is formed with radial teeth 36 (FIGS. 1, 2). By way of example only, a satisfactory centrifugal flow was attained, in the case of an impeller mounted on a .625″ shaft, and employing twenty-four impeller teeth to the inch, the teeth 36 having a 90° included angle and an outlet clearance with the side of the outer race of about .005″. The amount of oil pumped increased with speed of the shaft 10; at 1800 and 3600 r.p.m. the shield 28 is found to effectively clear the bearing of excess lubricant without pumping air sufficient to create foaming.

The impeller 28 acts as a centrifugal pump with an inlet connected directly with the interior of the bearing. As a centrifigal pump it is considerably more effective in pumping the liquid oil than it is for pumping a gas or air. At the speeds normally encountered in ball bearings it will only pump the oil. However, in order for the oil that is pumped out of the bearing to be displaced by a lower viscosity gas or air, there must be a gas or air supply means communicating with the interior of the bearing. Generally this can take the form of any communicating passageway from the interior of the bearing with the air space over the lubricant. Also, in those cases where the associated mechanisms aerates the lubricant, the centrifuging action of the centrifugal pump can obtain the air from the lubricant.

In the case of the shaft 10 being horizontal, preferably the top of the shield 28 protrudes above the lubricant level to provide air venting. If the shaft be vertical, the top one of the shields 26 or 28 will be disposed so that the top of its hub is above the oil level, and a slot or hole in the hub acts as the vent. If the bearing assembly 14 be fully submerged, air venting is normally effected by a hole (not shown) formed in the shaft 10. In the FIG. 1 arrangement, if the bearing were fully submerged, air or gas would be allowed to flow into the space between the shield 28 and the bearing rings, for instance through a hole (not shown) in the shaft 10. In any case, assuming the inner ring 18 is rotary, as the shield 28 radially expels oil continually from the teeth 36 during operation, and hence from between the race rings on one side thereof, a corresponding controlled in-flow of lubricant is admitted on the opposite side to the rolling elements through the stationary or nearly stationary hub 30, first along the shaft 10 and then radially outward of the inner race ring 18 to replace the lubricant which has been exhausted.

Although not shown herein it will be understood that if the outer race ring (instead of the inner) is the one rotated, the impeller shield 28 could be secured thereto (and probably modified in shape) and the nondriven or inlet-defining shield 26 would then be in sealing association with the inner race ring.

FIG. 3 shows a submergible, self-contained bearing assembly according to my invention. Assuming an inner race ring 40 is rotary and a coaxial outer race ring 42 is relatively stationary during operation, an annular inlet shield 44 which may be channel-shaped and of sheet metal is secured as by press-fit to the ring 42. As shown in FIG. 3 an outer rim 46 of the shield 44 is nested in a cutout side portion of the outer ring 32, and an inner rim 48 of the stationary shield 44 is radially spaced from the inner race ring 40 to define an annular, controlled inlet for lubricant indicated by an arrow 50. In this case, for centrifugally expelling lubricant from the opposite side of the bearing assembly and from rolling elements, for instance balls 52, retained in the races of the rings 40, 42, an annular impeller shield 54 is secured, for instance by press-fit, to the inner ring 40. The shield 54 may be of sheet metal and have its flanged inner mounting rim 56 recessed in a side of the inner ring 40. An inside circumferential margin of the rotary shield is formed as by crimping with radial corrugations or teeth 58 (FIG. 3 and 4) having clearance with the outer ring 42 thereby to exhaust the space between the rings and effect an out-flow indicated by an arrow 60 FIG. 3.

It will be understood that considerable variation in form, material, mounting and clearances may be provided in the shields 44, 54 incorporated in an aero-lube bearing of the type shown in FIG. 3 without departing from the scope of this invention. Omission of a separator (inclusion of which is optional) in FIG. 3 is merely for clarifying the nature of the controlled lubricant flow as shown by the arrows. If the bearing assembly of FIG. 3 be operative about a horizontal axis, the preferred maximum oil level would be at about the lower ends of the uppermost teeth 58.

FIG. 5 illustrates application of the present invention to mechanism such as an actuator to be used in different orientations if desired. The illustrative actuator is of the harmonic drive type as disclosed, for instance, in United States Letters Patent No. 2,906,143, granted upon an application filed in my name. Only so much of the mechanism will herein be described as is necessary to an understanding of the present invention. As disclosed in the patent just cited, a harmonic drive speed changer comprises three basic coaxial parts: (1) a circular spline 62 herein shown as comprising teeth 64 formed internally of a housing 66, (2) a lobar shaped wave generator generally designated 68 and including a wave generator bearing 70 with which this invention is especially concerned, and (3) a tubular flexspline 72 radially deflected by the bearing 70 to effect meshing of external flexspline teeth 74 at spaced circumferential localities with the circular spline teeth 64. An end cap 76 on the housing 66 carries a shielded bearing 78 for coaxially supporting an input shaft 80, an inboard end of which is received in a pilot bearing 82 in an inboard end of a coaxial output shaft 84. The latter is journaled in spaced bearings 86, 88 mounted in a reduced portion of the housing 66. As herein shown the wave generator 68 is secured to a driving hub 90 having press-fit on the rotary shaft 80. Accordingly rotation of the imposed shape of the flexspline 72, the teeth 74 of which are less in number than those of the circular spline teeth 62 by a multiple of the number of lobes on the wave generator 68, drives the flexspline 72 with greatly reduced speed, a closed end of the flexspline being secured to the output shaft 84.

FIG. 5 illustrates the harmonic drive assembly in its horizontal operating position with a maximum preferred running oil level at 92 just beneath the top of an uppermost one of a series of rolling elements, in this case balls 94, retained between an outer race ring 96 and an inner race ring 98 of the wave generator bearing 70. The latter is lubricated by an aero-lube system next to be described and including a substantially fixed shield 100 fixed and a rotatable shield 102. A radial outer face of the fixed shield 100 is urged into sealing relation with the outer race ring 96 by a spring 104 confined between a hub 106 of the shield and the closed end of the flexspline 72. The rotary shield 102 is in the form of a disk-like impeller having inside radial teeth 108 circumferentially disposed and providing an exhaust clearance with the outer ring 96 and with the inside of the shaped flexspline 72 at its minor axis. In this case the shield 102 is connected to the wave generator 68 by three screws 110 (1 only shown) extending respectively through suitable spacing washers.

It is essential to proper lubrication that the space between the shields 100, 102 have communication with the air space above the oil level 92 in all operating positions whether horizontal or otherwise. For this purpose the housing 66 is formed with a pair of ports **112*a* and 112*b*, and the cap 76 is likewise provided with a port 112*c*, the three ports being connected by a continuous vent line 114. The three ports 112 are respectively threaded to receive interchangeably a pair of circumferentially grooved air-bypass plugs 116 and an axially bored air vent plug 118, it being understood that the air vent plug 118 will always be installed in that one of the ports 112 which is uppermost during operation. To complete the venting, an air line 120 is bored in the shaft 80 and has communication, through a hole 121 in the wave generator hub 90, with an oil inlet passageway 122 afforded between the inside of the fixed shield hub 106 and the shaft 80 and the hub 90**.

Lubrication of the wave generator bearing 70 without excessive temperature rise and over a wide speed range, and whether the actuator be horizontal or with an end in up position, is assured with the aero-lube system operating as described. Excess oil is effectively removed centrifugally by the rotating shield 102 from the space between the rings 96, 98 to allow controlled in-flow of oil through the passageway 122 to the balls 94. Moreover, the mechanism is found to operate quieter, requires few or no oil changes, and high-speed efficiency is improved. In the device of FIG. 5 (and very probably in other mechanisms provided with aero-lube type bearings) in trial runs, regardless of oil levels above previously specified allowable minima, input torque (measuring energy dissipated) increased only very slightly following a very brief start-up interval in which the impeller shield 102 pumped out excess oil from between the rings 96, 98 of a flooded bearing. Thus with aero-lube bearings, regardless of operating position of their mechanism, power required is fairly independent of the amount of lubricant supplied, slightly more power being utilized when a bearing is submerged and operating under a greater head. Furthermore, it is found that shield configurations and shield clearances are not especially critical; a variety of shield designs may be employed with substantially similar results. This is to say that they all perform similarly in eliminating excess oil from a flooded bearing so that within the first 10 seconds, approximately, lubricant churning is dissipated and quiet, efficient performance begun.

Having thus described my invention, what I claim as new and desire to secure by Letters Patent of the United States is:

1. A self-contained antifriction bearing assembly comprising an inner and an outer race ring for confining a plurality of rolling elements therebetween, and means including a pair of shields recessed in axially opposite sides, respectively, of said rings for controlling lubricant flow to and from said elements, one of the shields being associated with a substantially stationary one of the rings to define with a portion of the inner ring a lubricant inlet, and the other of said shields being rotatably mounted to define with the outer ring a lubricant outlet, the rotatable shield being formed with corrugations wholly within one of the race rings to expel lubricant from between the rings and through said outlet.

2. An antifriction bearing adapted to be partly or wholly submerged for operation with respect to a lubricant level, comprising an inner rotary and an outer substantially stationary race ring, a series of rolling elements confined between said race rings, an annular shield secured to the outer race ring and defining a lubricant inlet with the inner race ring, an air supply means communicating with the lubricant inlet, and an annular impeller shield secured to the rotary inner ring for rotation therewith, said impeller shield having radial teeth adapted to centrifugally pump lubricant away from the rolling elements and enable lubricant to be admitted thereto through said inlet.

3. A bearing as set forth in claim 2 wherein the shields are respectively disposed in opposite side recesses formed in said race rings.

4. A bearing as set forth in claim 2 wherein the impeller shield has its teeth formed on an inner face, the outer periphery of the teeth and their apices being spaced from the outer race ring to define an exit passageway for the lubricant.

5. A bearing as set forth in claim 2 wherein the faces of the impeller shield teeth are formed with substantially 90° divergence to permit effective pumping action regardless of their direction of rotation.

6. A bearing as set forth in claim 2 wherein each of the shields is channel-shaped.

7. In a mechanism including an antifriction bearing operable in a housing containing lubricant and gas, the bearing being disposed to be at least partly submerged in the lubricant, and said bearing including a rotary inner and a substantially stationary outer race ring and rolling elements constrained therebetween, lubricating means associated with the bearing, said means including a pair of shields, one of the shields being in sealing relation to said outer race and adapted to define a restricted inlet to said elements for the lubricant and the gas, and the other of the shields being rotatably mounted and formed to function as an impeller for exhausting lubricant from an exit side of said rolling elements.

8. A mechanical device adapted for operation in different attitudes comprising a housing, mechanism operable within said housing and including a bearing having an inner and an outer race ring and rolling elements constrained between said race rings, means comprising a pair of shields associated one with each opposed side of said race rings for defining lubricant passageways, respectively, to and from said rolling elements, and means for venting the bearing in the different attitudes of the device, the last mentioned means including an air line extending in the housing between its ends and communicating with three housing ports spaced one at each extremity and one intermediate thereto, and interchangeably mounted plugs in the respective ports, two of said plugs being of the air bypass type and the third being an air vent plug mounted in the uppermost one of said ports.

9. In a harmonic drive type mechanism of the type comprising a housing having a circular spline, a flexspline for cooperating at circumferentially spaced localities with the circular spline, and a wave generator provided with an anti friction bearing for imparting the shape of the wave generator progressively to the flexspline, said bearing including an inner and an outer race ring and rolling elements, drive means journaled in the housing for rotating the wave generator, and means for enabling the bearing to run partly or fully submerged in lubricant within the housing, the last mentioned means including a first shield in sealing relation to the outer race ring and defining at least in part an oil inlet to the rolling elements, an air supply means communicating with the rolling elements, and a second shield rotatably connected to said drive means and having impeller formation circumferentially disposed on the opposite side of said rolling elements from the first shield to pump excess fluid from the space between said inner and outer race rings.

10. A mechanism comprising a housing and an antifriction bearing assembly therein adapted for use in partly or fully submerged position with respect to lubricant, the assembly including a rotary inner and a relatively non-rotary outer race ring for constraining rolling elements, and a pair of shields associated with said race rings, respectively, one of the shields to define an annular inlet for lubricant to be admitted to the rolling elements, and the other to define an annular outlet for fluid to be discharged from between the race rings, said other shield being formed as an impeller and adapted to rotate with said rotary inner race ring, and a vent line means in said housing for venting the space between the race rings to atmosphere.

11. A mechanism as set forth in claim 10 wherein said vent line means includes three longitudinally spaced housing ports communicating therewith, and three interchangeable plugs mountable in said ports, two of said plugs being of the air bypass type and the third being an air venting plug to be mounted in the uppermost port.

References Cited

UNITED STATES PATENTS 2,011,192 8/1935 Comstock ---------- 308—187.2

FOREIGN PATENTS 1,026,133 3/1958 Germany.

MARTIN P. SCHWADRON, *Primary Examiner.*

FRANK SUSKO, *Assistant Examiner.*